US008789411B2

(12) United States Patent
Luce

(10) Patent No.: US 8,789,411 B2
(45) Date of Patent: Jul. 29, 2014

(54) DEVICE FOR CLAMPING A PRESSURE AND TEMPERATURE SENSOR HOUSING ONTO A VEHICLE RIM AND SUITABLE HOUSING

(75) Inventor: Dominique Luce, Bordes de Rivière (FR)

(73) Assignee: LDL Technology S.A.S., Ramonville Saint Agne (FR)

( * ) Notice: Subject to any disclaimer, the term of this patent is extended or adjusted under 35 U.S.C. 154(b) by 18 days.

(21) Appl. No.: 13/149,343

(22) Filed: May 31, 2011

(65) Prior Publication Data

US 2011/0296907 A1 Dec. 8, 2011

(30) Foreign Application Priority Data

Jun. 4, 2010 (FR) ...................................... 10 54426

(51) Int. Cl.
*G01M 17/02* (2006.01)
(52) U.S. Cl.
USPC .......................................................... 73/146
(58) Field of Classification Search
USPC ............................................... 73/146–146.8
See application file for complete search history.

(56) References Cited

U.S. PATENT DOCUMENTS

| 5,637,926 | A | * | 6/1997 | Zedonis | 307/10.1 |
| 6,631,637 | B2 | * | 10/2003 | Losey | 73/146 |
| 6,805,000 | B1 | * | 10/2004 | Sheikh-Bahaie | 73/146.8 |
| 7,091,840 | B2 | * | 8/2006 | Ichinose | 340/447 |
| 7,350,408 | B1 | * | 4/2008 | Rogers et al. | 73/146 |
| 2004/0118195 | A1 | | 6/2004 | Nespo et al. | |
| 2006/0220812 | A1 | * | 10/2006 | Luce | 340/442 |
| 2006/0248947 | A1 | * | 11/2006 | Phalak et al. | 73/146 |
| 2007/0039382 | A1 | * | 2/2007 | Baum | 73/146 |
| 2010/0147063 | A1 | * | 6/2010 | Suzuki et al. | 73/146.5 |
| 2010/0236325 | A1 | * | 9/2010 | Tanuma | 73/146.3 |

OTHER PUBLICATIONS

Preliminary Search Report, Jan. 11, 2011, for French Application 1054426 corresponding to the instant application.

* cited by examiner

*Primary Examiner* — Andre Allen
(74) *Attorney, Agent, or Firm* — Jackson Patent Law Office

(57) ABSTRACT

A device for clamping an electronic pressure and/or temperature measurement housing onto a rim inside of a tire, comprises a cable including a plurality of twisted filaments. The cable makes a turn around the rim, and urges the housing against the surface of the rim, forming a resilient connection allowing axial movement of the housing on the rim, thereby preventing the housing from bearing a stress of the tire during mounting and removal stages.

10 Claims, 5 Drawing Sheets

DEVICE FOR CLAMPING A PRESSURE AND TEMPERATURE SENSOR HOUSING ONTO A VEHICLE RIM AND SUITABLE HOUSING

FIELD OF USE OF THE INVENTION

The present invention relates to the field of systems for monitoring the pressure and temperature of vehicle tires and, in particular, to adaptations enabling the electronic measurement housing containing the sensor to be attached to the rim.

DESCRIPTION OF THE PRIOR ART

One of the current clamping solutions consists in using a banding attaching the electronic housing by passing beneath the housing or through slots made therein for passing the strap and for closing same over the circumference of the rim. Such a solution has the disadvantage of sidewalls of the tire being applied against the housing when the tire is mounted onto or removed from the rim.

Subjecting the housing to such stresses can have such consequences as:
the banding being torn away,
damage to the housing,
damage to the inner wall of the tire during said tearing away,
the appearance of bulges in the damaged portions,
etc.

For example, it has been observed that, during mounting of a heavy goods vehicle tire, a sensor housing attached to the rim with a strap or stainless steel banding having a flat section (12 to 1.2 mm) cannot move axially parallel to the axis of the wheel by more than 40 mm. As a matter of fact, this travel corresponds to the plastic deformation limit of the strap. Therefore, once this movement is reached during the mounting and removal stages, the consequence of the strap being deformed is that:
the housing is no longer urged against the rim and rotates freely or, more commonly
the strap breaks.

Such a movement is largely possible due to the fact that the center portion of the rim commonly reaches 80 mm.

Even though the aforementioned technical problems are not pointed out therein, this configuration is found in US Patent 2004/0118195, which describes an apparatus for monitoring the parameters of a tire mounted on a vehicle wheel including a sensor configured to be installed inside the tire. The sensor is attached to the wheel rim so as to prevent same from being exposed to the liquid present in said tire. According to one embodiment, the sensor is attached to the wheel by means of two straps or bandings which extend around a circumferential surface of the rim and which are associated with a pedestal base coupled to said sensor.

The fact that the sensor or the housing containing the sensor is associated with a pedestal base does indeed increase the height of the assembly and therefore the obstacle that same comprises during the mounting and removal stages.

In addition, the volumes of the assembled pedestal base and housing assume a concave peripheral shape which becomes an area for holding the bead of the tire, a hold which will end when the connection is broken, either between the pedestal base and the housing or the banding or bandings, as described above.

The use of bandings also not only has the disadvantage of not being the most heavy-duty solution, but likewise that of not being adaptable to tapered rim profiles. As a matter of fact, by definition, a band has a single diameter on both edges thereof, which therefore does not allow the adaptation of same to a variation in diameter.

SUMMARY OF PREFERRED EMBODIMENTS OF THE INVENTION

Based on these established facts, the applicant conducted research aiming to solve this problem of the electronic housing attachment means being torn away.

This research resulted in the design and production of a particularly successful attachment device for an electronic housing, which enables the disadvantages of the prior art to be eliminated while at the same time reducing the costs for such a device.

The preferred embodiments of the invention likewise relate to the electronic housing containing the sensor, which is adapted to such an attachment device.

According to the preferred embodiments of the invention, the device for clamping an electronic pressure and/or temperature measurement housing onto a rim inside of a tire, consists of at least one cable which, making at least one turn around the rim, and urging the housing against the surface of the rim, forms a resilient connection allowing axial movement of the housing on the rim and thereby preventing said housing from bearing the stress of the tire during the mounting and removal stages.

The use of a cable makes it possible to combine both the function of a positional hold on the rim and that of enabling said housing from adopting an avoidance behavior with regard to the stresses exerted by the edges of the tire during the mounting and removal stages. As a matter of fact, by inserting the housing between the loop formed by the cable and the surface of the rim, the attachment offered by tensioning the cable enables an optimized positional hold.

By proposing the housing to be urged by means of a cable, said housing will be able to move by sliding rotationally around the axis of the wheel, over the surface of the rim, so as to be in contact with the sidewall of the tire; the stress created by the latter tends to cause the housing to slide over the rim along the cable, so as to prevent any damage to the housing, the attachment cable thereof or the tire. The housing can slide along the cable and rotate with the cable.

The use of a cable guarantees improved resistance to the risk of breakage to which same is subjected when the housing held thereby is subjected to the pressure exerted by the tire walls during the mounting and removal stages. The bandings of the prior art which, by nature, have flat or at least rectangular profile attachment bands, are much more fragile than a cable.

The use of a cable which has a substantially circular profile has the advantage of making only tangential contact with the surface of the rim. This reduced contact surface, compared with that offered by a strap, facilitates the axial movement of the cable and therefore that of the housing.

Another technical effect offered by the solution of using a cable as a means for attaching the housing to the rim, relates to the inherent resiliency of the cable which, by reason of the material thereof, the number of wires comprising same and the twisting thereof, allows a percentage of elastic stretching. This possibility of stretching allows the housing to move by sliding axially over the surface of the rim until same comes to lean against a radial projection of the rim, whereby, if the edge of the tire is still in contact with the housing after the movement, it is no longer the housing and the cable which take on the stresses but the rim. An equivalent degree of resiliency cannot be obtained with a strap-type band of solid material. Thus, for example, the applicant's tests revealed that a stainless steel banding having a thickness of 1.2 mm had an elongation percentage within the elastic and linear range of 2.3%, whereas a 1.5-mm diameter cable likewise made of stainless steel had an elongation percentage of 4.4%.

Another advantage to such a solution, of course, lies in the low cost thereof as well as the implementability of same.

According to another feature, said cable goes around the rim twice and is connected to the two longitudinal edges of the housing. In addition to improved distribution of the clamping force exerted by the cable on the housing against the rim, the use of a single cable on two sides of the housing is particularly advantageous in that, when the axial action of the sidewall of the tire on the side of the housing has the effect of urging said housing against an arm of the U formed by the rim profile, the possible raising of one side of the housing will result in a more significant clamping of the other loop of the cable, thereby guaranteeing the positional hold thereof between the arms of the U (drop center) formed by the rim profile. Such a technical effect is enabled by the fact that, according to another particularly advantageous feature of the preferred embodiments of the invention, the loop or loops of the cable come to bear against the upper portion of said housing.

Whether by means of one or more loops, another advantage of the device is that of fitting to the profile (drop center) of the rims, whether cylindrical, as is often the case for steel rims, or tapered, as is often the case for aluminum rims. As a matter of fact, the resiliency and tensioning of the cable enables the loop diameter to be fitted exactly to the diameter of the rim profile. This adaptation constitutes a marked progress in comparison with the attachments of the prior art using banding or a strap or straps, which require a rim profile with a cylindrical portion corresponding to at least the width of the banding.

According to another feature, said cable is tensioned during the use thereof. In fact, the installation of said device for clamping a pressure and temperature sensor housing onto a vehicle rim is characterized in that it consists in using a steel cable which goes around the rim so as to urge said housing against the rim and in selecting the characteristics of the cable and the tensioning value thereof during use of same, so that it is capable of elastically deforming when the housing moves, which movement takes place during the mounting and removal stages, via contact of the tire walls with said housing.

According to another particularly advantageous feature of the preferred embodiments of the invention, the device comprises a connection module which ensures the attachment of the housing to the cable and the connection of the two ends of the cable.

According to another particularly advantageous feature of the preferred embodiments of the invention, the device comprises a connection module which ensures the attachment of the housing to the cable, an attachment which, starting from a certain stress threshold, is designed to tend towards breakage, thereby releasing the housing to slide on the cable.

Such an attachment guarantees that the housing moves beneath the cable in the event of high stress. This voluntary breakage does not call into question the urging exerted by the cable, but renders the position of the housing random relative to the cable. According to one embodiment, said connection module bears against a projection coming from the housing, a projection having a voluntarily weakened section or one made of a fusible material capable of being broken starting with a certain stress threshold.

The preferred embodiments of the invention likewise relate to an electronic housing which is adapted to the clamping device described above, i.e., to a cable attachment. To accomplish this, the body of the housing, which matches the shape of the rim, is provided with two grooves into which the loop or loops of the cable are threaded. Alternatively or in addition to said grooves, preformed channels in the housing can provide the same function.

The preferred embodiments of the invention likewise relate to a housing, characterized in that it includes a concave shape on the outer surface thereof for accommodating said connection module, from which a radial projection projects, against which said connection module comes to bear, and which is capable of breaking in the event that a high degree of stress is exerted on the housing.

The basic concepts of the preferred embodiments of the invention have been explained above in the most elementary form thereof, and other details and features will become more apparent upon reading the following description in connection with the appended drawings, which, for non-limiting illustrative purposes, provide an embodiment of an attachment device in accordance with the invention.

DESCRIPTION OF THE PREFERRED EMBODIMENTS

Figure 1:
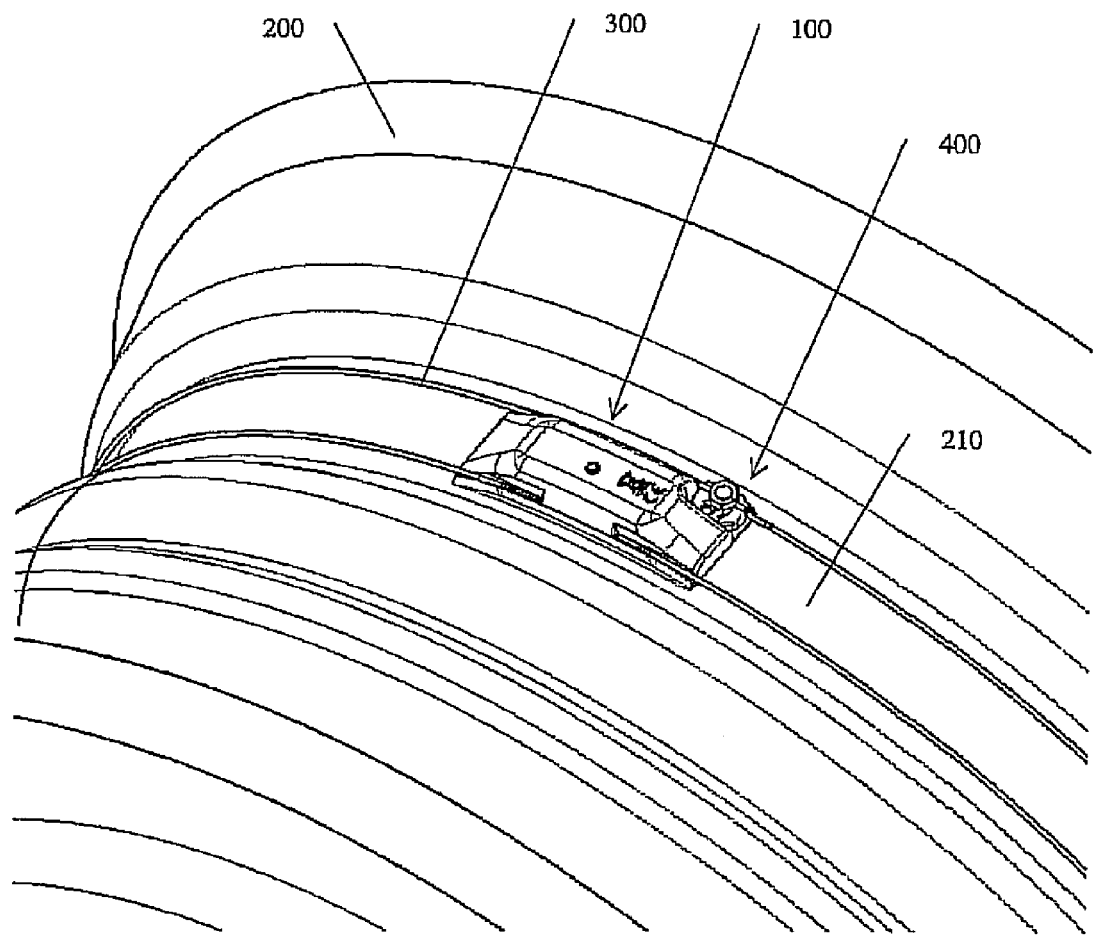
FIG. 1 is a diagram drawing of a partial exterior perspective view of the mounting of a housing on a rim, using an embodiment of a device in accordance with the invention.

As shown in the drawing of FIGS. 1 to 4, the housing 100 containing the various sub-assemblies involved in measuring and transmitting the quantities, such as the temperature and pressure inside the tire (not shown), is urged against the cylindrical surface of the rim 200 by means of a cable 300.

According to a preferred but non-limiting embodiment, said cable consists of a plurality of twisted stainless steel wires and has a diameter of 1.5 mm.

To that end, the housing 100 assumes a shape or is sufficiently flexible in order to match the cylindrical surface 210 of the rim 200.

Figure 3:
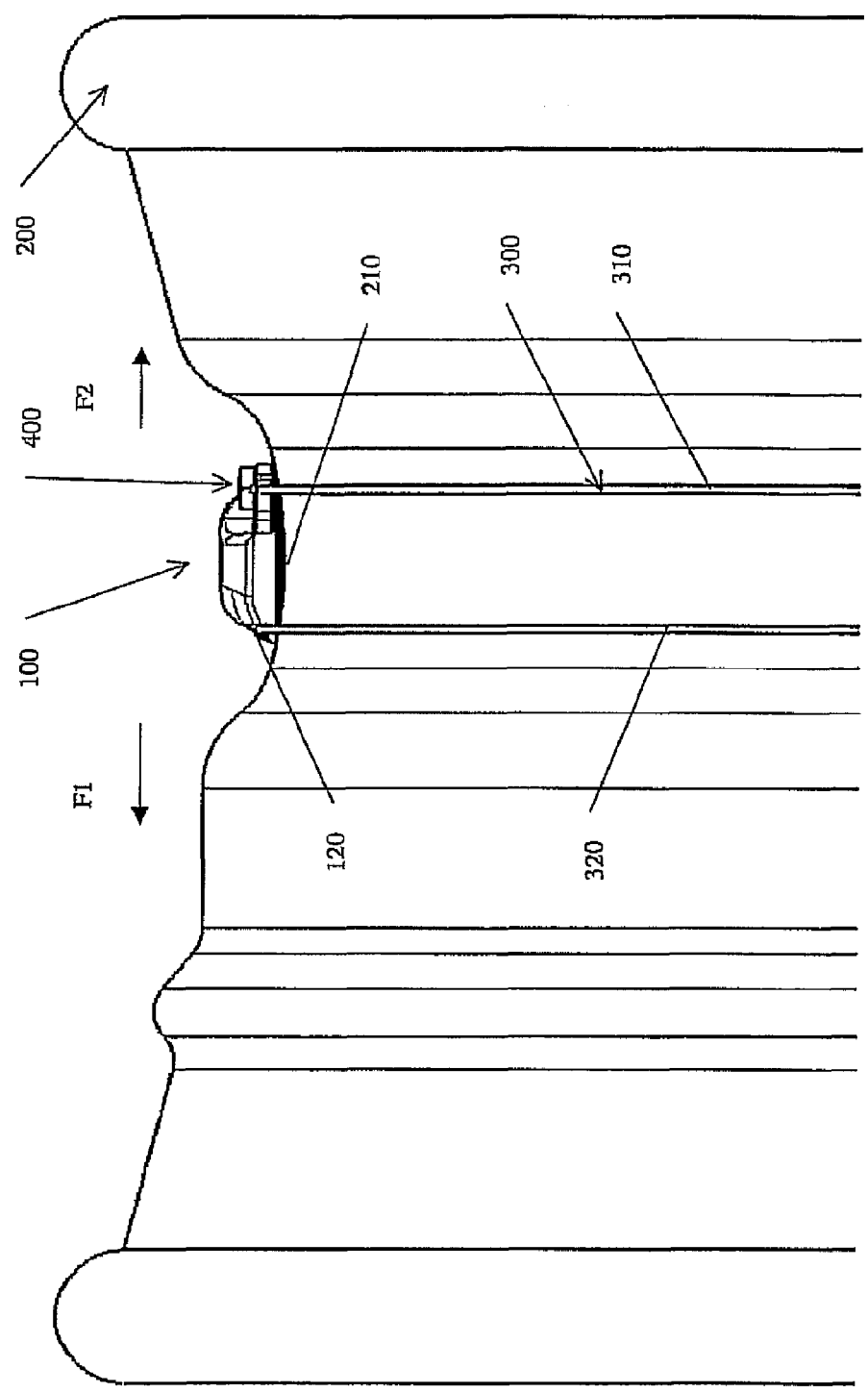
FIG. 3 is a partial side view of said mounting.

As shown in the drawing of FIG. 3, the so-called "drop center" profile of the rim 200 forms a flared U at the bottom of which (cylindrical surface 210) said housing 100 is arranged.

Figure 2:
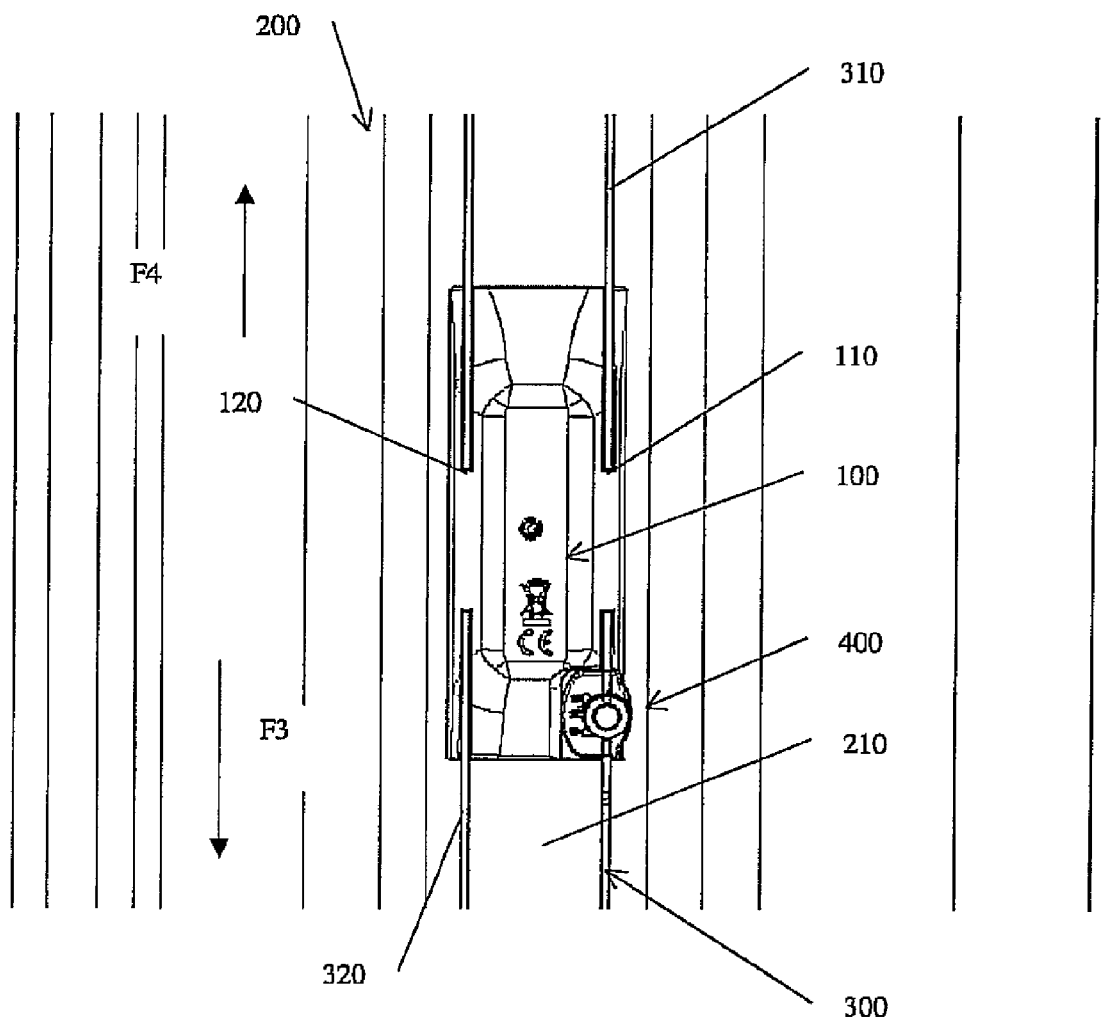
FIG. 2 is a partial top view of said mounting.

By surrounding the housing on the rim, the cable 300 urges the housing 100 into the bottom of the U while forming two loops 310 and 320 around the rim 200, which bear against the side edges of the housing 100, as shown in the drawing of FIG. 2.

To that end, said housing 100 includes two longitudinal side channels 110 and 120 on the upper surface thereof, into which the two loops 310 and 320 are threaded. According to the embodiment shown, these channels 110 and 120 are extended at the two ends thereof by grooves likewise provided in the housing.

The combination of these channels 110 and 120 and these grooves that have been preformed in the housing guarantee the connection of same to the cable 300.

The size of the channels and grooves as well as the material of the housing 100 enable the cable 300 to slide for positioning purposes but also in order to enable the avoidance movement described below.

The resiliency of the cable 300 which, according to a preferred embodiment, is close to 4.4%, will enable the sidewall of the tire to axially carry away the housing 100 and to cause it to move in the direction of arrow F1 or F2 (see FIG. 3), over the cylindrical surface 210 of the rim 200. Once the U-shaped edges of the profile have been reached, it is the rim 200 which will counter the stresses transmitted by the sidewalls of the tire.

The housing 100 has an insignificant length in comparison to the stress-transmitting area, which will cause same to:
- exit the stress area and slide beneath the tire (beneath the smallest diameter of the sidewall of the tire) while resuming its initial position,
- and/or slide along the cable 300 on the cylindrical surface 210, according to arrows F3 or F4, as shown in the drawing of FIG. 2.

Thus, the housing 100 and the device for attaching same to the rim 200 do not oppose the stresses of the tire but use said stresses in order to move the sensor housing, owing to the resiliency of the cable 300 and/or to the slideability either of the housing 100 along the attachment cables thereof or of the housing 100 and cable 300 around the rim 200.

Figure 4:
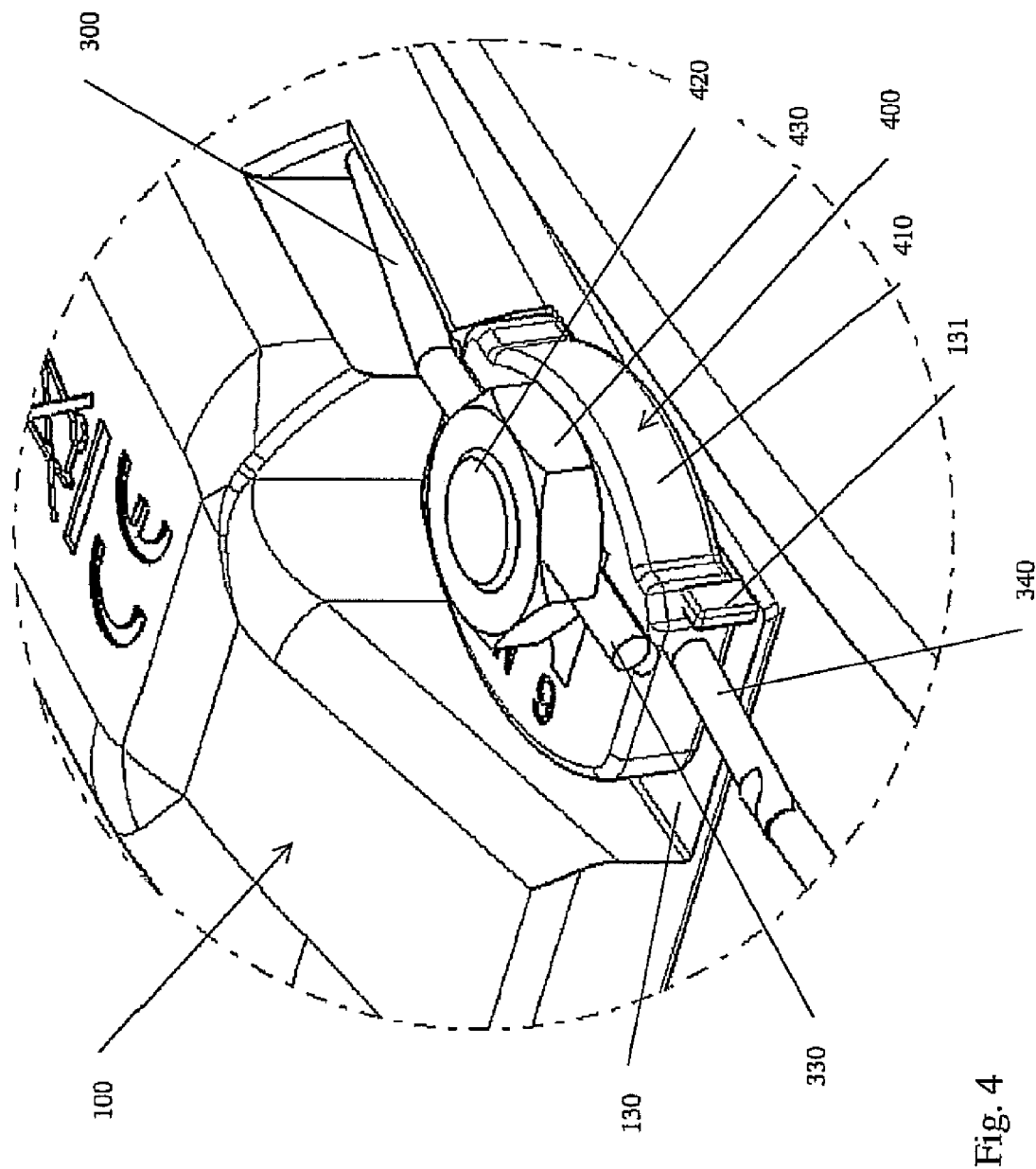
FIG. 4 is an exterior perspective detail view of the connection module of the housing cable.

As shown in the drawing of FIG. 4, a connection module 400 ensures that the housing 100 is held in position on the cable 300. This connection module includes a body 410 accommodating a threaded rod 420 onto which a nut 430 is screwed. According to an embodiment not shown, said threaded rod 420 is drilled transversely so as to enable the end of the cable 300 to be threaded therethrough and to enable same to be clamped by tightening the nut 430.

According to another embodiment not shown, the cable 300 is positioned between said body 410 and the nut 430 for clamping purposes.

As shown, the housing 100 includes a concave shape 130 on the upper surface thereof for accommodating the volume of said connection module 400. According to an embodiment of the invention, a projection 131 projects radially from the bottom portion of said concave shape 130, against which the body 410 of the connection module 400 comes to bear.

According to an embodiment of the invention, said projection 131 is dimensioned such that, if the housing 100 and/or the cable 300 are subjected to excessive stress, the projection 131 breaks and enables the connection module 400 to be disconnected from the housing 100, thereby enabling same to slide along the surface of the rim 200 without interfering with the clamping function.

In order to simplify the device and according to the non-limiting embodiment shown, said connection module 400 likewise enables the two ends 330 and 340 of the cable 300 to be joined together.

According to another embodiment not shown, the body of the connection module is provided with a bore positioned over the projection of said housing.

Figure 5:
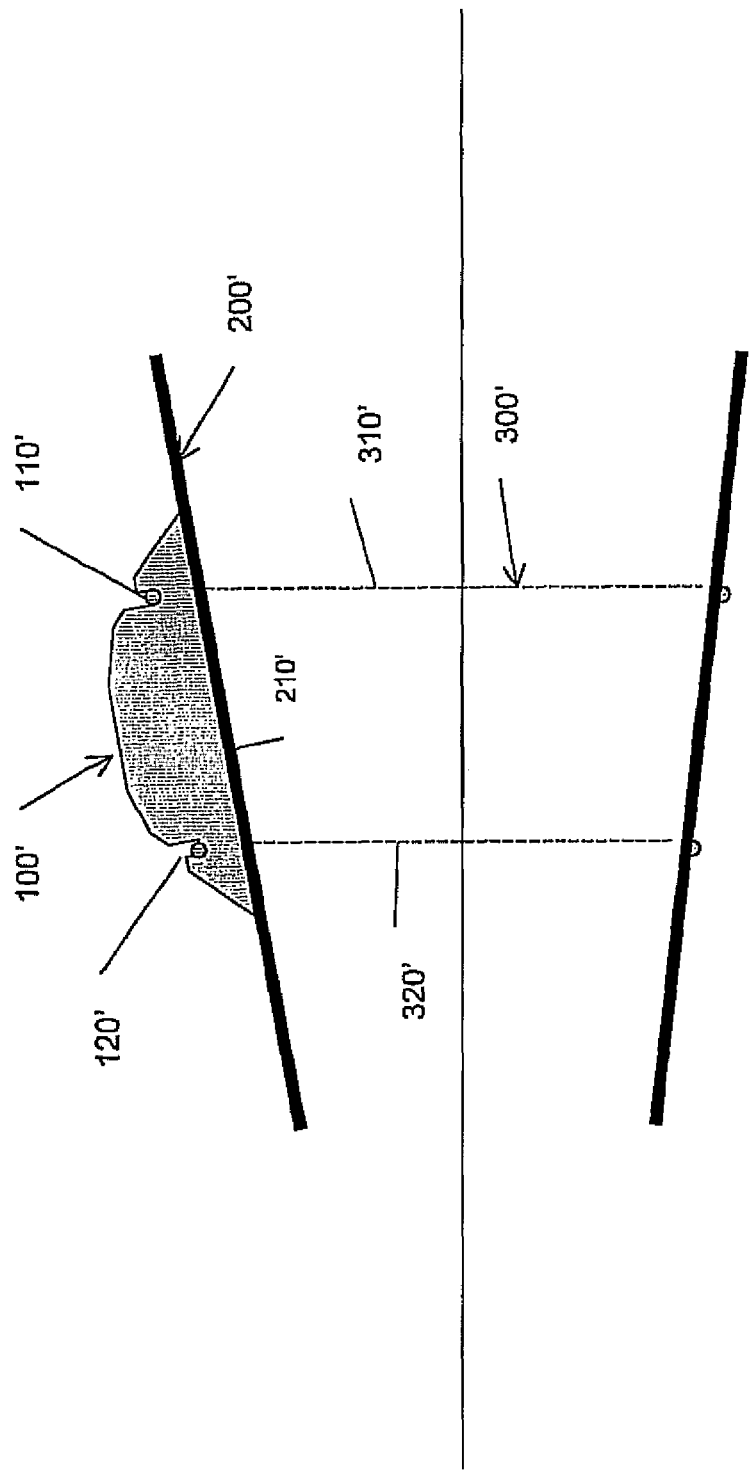
FIG. 5 is a diagram drawing of a side view of the mounting of said housing on a rim having a tapered profile.

FIG. 5 shows the advantages of the clamping device of an embodiment of the invention, as used for attachment to a tapered rim profile 200', like that which may be found on aluminum rims. It is clearly apparent that the clamping offered by implementing two loops of a wire product such as the cable 300' best enables the housing 100' to be urged against the tapered surface 210' of the rim 200', despite the difference in diameter due to the taper. Such a technical result cannot be obtained by a banding attachment means using a band of material of which both ends cannot be joined together under good conditions. According to this embodiment, said cable 300' clamps said housing 100' by means of two loops 310' and 320' around the rim 200', the loops bearing against the upper surface of the housing 100, and the surface being provided with two grooves 110' and 120'.

It is understood that the clamping device and the housing have just described and shown above with a view to disclosure rather than limitation. Of course, various arrangements, modifications and improvements may be made with regard to the above example, without thereby departing from the scope of the invention.

Thus, for example, during installation, the cable is tensioned (approximately 100 Newtons) with a cable puller type of tool, prior to the final locking of the cable 300 in unit 400. This tensioning, combined with the elastic properties of the cable, enables the desired avoidance behavior to be obtained.

According to another embodiment not shown, the connection module 400 can be molded directly onto a cable end 300 and form an integral part thereof, in order to facilitate industrial applicability of an embodiment of the invention.

The invention claimed is:

1. A device configured to couple to a rim inside of a tire, the device comprising:
    an electronic pressure and/or temperature measurement housing, the housing defining a center line;
    a first cable-segment engaged with the housing, the first cable-segment being configured to encircle the rim; and
    a second cable-segment engaged with the housing such that the center line is in a gap between the second cable-segment and the first cable-segment, the second cable-segment being configured to encircle the rim,
    the first and second cable-segments being configured to urge the housing against the surface of the rim, forming a resilient connection allowing axial movement of the housing on the rim and thereby preventing the housing from bearing a stress of the tire during mounting and removal stages of the tire.

2. A device according to claim 1, characterized in that the first cable-segment bears against the upper portion of the housing.

3. A device according to claim 1, characterized in that it comprises a connection module providing the attachment of the housing to the first cable-segment and the connection of ends of the first-cable segment.

4. A device according to claim 1, characterized in that it comprises a connection module providing the attachment of the housing to the first cable-segment, an attachment which, starting from a certain stress threshold, is designed to tend towards breakage, thereby releasing the housing to slide on the first cable-segment.

5. A device according to claim 1, characterized in that the first cable-segment is configured to be tensioned during the use thereof.

6. A device according to claim 1, characterized in that a body of the housing matches a shape of the rim and is provided with two grooves into which the first cable-segment is threaded.

7. A device according to claim 4, characterized in that the housing includes a concave shape on the outer surface thereof for accommodating the connection module, from which a radial projection projects, on which the connection module comes to bear, and which is capable of breaking in the event that a high degree of stress is exerted on the housing.

8. A device according to claim 1 wherein the first cable-segment includes a plurality of twisted filaments.

9. A device according to claim 1 wherein the first cable-segment and the second cable-segment are part of a common cable.

10. A device according to claim 1 wherein the housing defines a channel, and the first cable-segment is engaged with the housing via the channel.

\* \* \* \* \*